United States Patent [19]

Mellard

[11] Patent Number: 4,727,677
[45] Date of Patent: Mar. 1, 1988

[54] RODENT TRAP

[76] Inventor: George K. Mellard, 43 Pineview Avenue, B18, Cardiff, N.J. 08232

[21] Appl. No.: 67,980

[22] Filed: Jun. 30, 1987

[51] Int. Cl.⁴ ............................................. A01M 32/02
[52] U.S. Cl. ............................................................. 43/61
[58] Field of Search ...................................... 43/61, 60

[56] References Cited

U.S. PATENT DOCUMENTS

| | | | |
|---|---|---|---|
| 1,273,185 | 7/1918 | Reich | 43/61 |
| 1,581,297 | 4/1926 | Schmuck | 43/60 |
| 2,155,006 | 4/1939 | Cooper | 43/61 |
| 2,803,918 | 8/1957 | Hall | 43/61 |
| 3,394,487 | 7/1968 | Wood | 43/61 |
| 4,578,892 | 4/1986 | Melton | 43/61 |

Primary Examiner—Gene P. Crosby
Attorney, Agent, or Firm—Chenpatents

[57] ABSTRACT

A rodent trap especially suited for trapping mice or rats comprises a shell having two parallel sides and a top. A separate enclosure having a concave door, a concave roof and a convex connecting side rigidly connected to the door at one end and to the roof at the other end forming a triangular spaced interior. The enclosure is set inside the shell and pivotally connected to the side walls at the juncture of the door and connecting side of the enclosure. Thus the enclosure can be tilted to a stable position with the enclosure totally enclosed by the side walls and a less stable position with the enclosure partially outside the shell and the interior space of the enclosure is accessible to a rodent. When the rodent enters the enclosure, and climbs onto the connecting side for the bait, the rodent's weight tilts the enclosure backward to a totally closed position, and the rodent is thus trapped within.

10 Claims, 4 Drawing Figures

RODENT TRAP

BACKGROUND OF THE INVENTION

1. Field of the Invention

This invention relates generally to rodent traps and more specifically to traps suitable for trapping mice, rats and other small rodents in a reusable or disposable trap allow the removal of trapped animal without physical contact.

2. Description of Prior Art

Many animal traps have been invented. Some of these traps, including spring-loaded impalers and jaw-type traps are dangerour to domestic animals and humans. The disposal of the trapped animal from such traps, to most people, is a gruesome experience. Some types of traps are excessively elaborate and expensive. Traps employing electronic sensing devices for detecting mice and rats cannot generally be economically justified. The following U.S. patents disclose state-of-the-art traps involving self-closing doors, a category into which the trap of the present invention belongs. U.S. Pat. No. 4,578,892 discloses a trap having two elongated cylindrical compartments joined at an angle and a door at one end which swings shut. Once a rodent enters the rear compartment, the rodent's weight causes the door to close, thereby trapping the rodent. The disadvantage of this trap is that if a rodent should climb on the outside of the rear compartment, the door will close without trapping any animal, rendering the trap useless until it is manually reset. U.S. Pat. No. 1,273,185 to Reich discloses an animal trap in the form of a mailbox-shaped tube which rotates about a foot which is integral and at a right angle to a door. The weight of the animal causes the tube to rotate backward about the foot, the foot tilts forward, and the door closes. This mechanism is rather complex, not reliable, and expensive.

Still another U.S. Pat. No. 1,581,297 to Schmuck, discloses a rectangular tube balanced on a V-shaped fulcrum support. The open end of the tube is initially inclined downward and includes a door which is designed to lower automatically within a pair of parallel slots when the weight of the animal forces the rear portion of the tube down and the front portion of the tube up. This door mechanism is complicated, and again there is the possibility of the animal climbing on the outside of the back portion of the tube, triggering the mechanism without trapping the animal and rendering the trap inoperative.

Therefore, there is a need for an economical, reliable, and simple rodent trap. It is the object of this invention to provide such a trap.

SUMMARY OF THE INVENTION

The aforementioned objectives and advantages of the present invention as well as additional objectives and advantages thereof will be more fully understood as a result of the following detailed description of preferred embodiments of the invention taken in conjunction with accompanying drawings. The rodent trap in accordance with this invention generally resembles a house. It comprises a shell structure consisting of a rectangular top and two vertical parallel rectanglular side walls connected to the top. It further comprises a separate, generally triangular enclosure having three sides which are rigidly connected at the corners. The first side of the triangular enclosure acts as a door. Its outer surface is preferably concave. The second side of the enclosure forms a roof. Its outer surface is also preferably concave. The third side of the triangular enclosure is slightly convex outward. At the juncture of the first and third side of the enclosure, there is provided a traverse pin having two outwardly-projecting ends for supporting the enclosure on both sides in the shell structure as explained below.

The enclosure described above is placed inside the shell, the ends of the pin pivotally fitting into two slots, or two holes, of the side walls of the shell. The third side of the enclosure is in the interior of the shell. The second, roof side of the enclosure is generally nearest the top of the shell. The first, door side of the enclosure faces outward from the shell opening between the two side walls.

The enclosure, when thus placed into the shell, can be tilted back and forth between two positions: a stable position, with the enclosure inside the shell and the interior space of the enclosure totally enclosed by the sides of the enclosure and the side walls of the shell; and a less stable position in which the enclosure is tilted forward such that the door is entirely outside and the roof of the enclosure is partially outside the shell. In the latter position, the interior space of the enclosure is exposed to the outside via two openings defined by the edges of the door and roof sides of the enclosure and the side walls of the shell, and the interior space of the enclosure thus is accessible to a rodent from either side of the door.

A bait is placed in the interior space, on the third side of the enclosure adjacent to the roof. A small ledge fixed to the inner face of the third side of the triangular enclosure provides a step for the rodent to step on while reaching for the bait.

When a rodent climbs into the enclosure through one of its exposed side openings in order to eat the bait, steps on the ledge and reaches up toward the bait, the animal's weight causes the enclosure to tilt into its stable, closed position, trapping the animal within.

At the midpoint and outside of the juncture of the roof and the third side of the triangular enclosure, there may be provided a small, generally pointed projection which, in the enclosure's open position, comes to rest against the underside of the top of the shell. This projection serves to minimize the rodent's mechanical effort in tipping the enclosure backward by reducing friction and preventing the enclosure from becoming jammed in the shell structure.

The curvature of the sides of the triangular enclosure is designed to minimize the space behind door within the enclosure in which the rodent's weight would fail to tilt the enclosure into the closed position.

DESCRIPTION OF PREFERRED EMBODIMENT OF THE INVENTION

Figure 1:
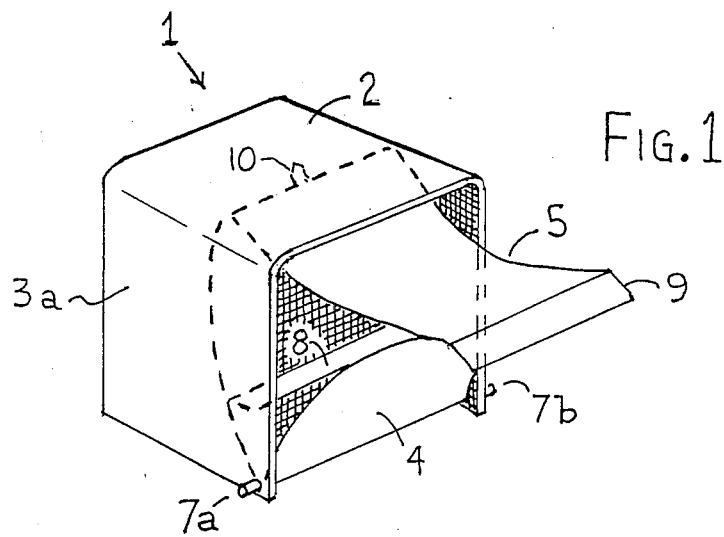
FIG. 1 is an isometric view of the rodent trap of this invention.
Figure 2:
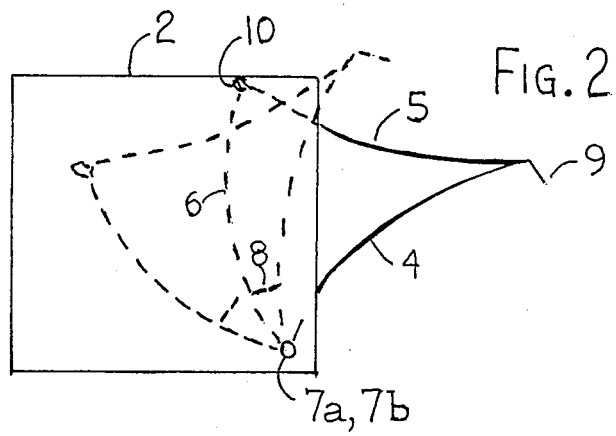
FIG. 2 is a side view of the rodent trap showing both positions of the enclosure.
Figure 3:
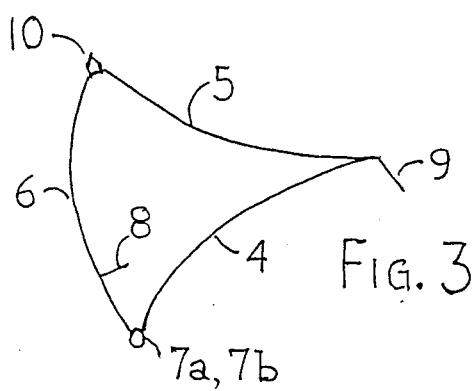
FIG. 3 is a side elevation of the enclosure.
Figure 4:
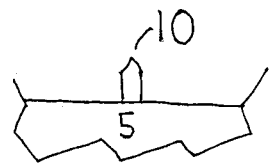
FIG. 4 is an enlarged view of the projection at the juncture of the roof and the third side of the enclosure.

Referring to the drawings in FIG. 1–3, the rodent trap in accordance with this invention generally resembles a house. It comprises a shell structure 1 consisting of a rectangular top 2, and two vertical parallel rectangular side walls 3a and 3b connected along their edges to the top 2. These edges may be rounded. It further comprises a separate generally triangular enclosure having three sides which are rigidly connected at the corners, forming a triangular spaces structure. Both the shell structure and the enclosure are best made by bending appopriately cut pieces of sheet metal. Alternatively,the trap may be made of molded plastic.

The first side 4 of the triangular enclosure acts as a door. Its surface may be flat but preferably, its outer surface is concave. The second side 5 of the enclosure forms the roof. Its outer surface preferably is concave. The third side 6 of the triangular enclosure has a convex outer surface. The third side 6 is rigidly connected to the first side 4 at one end and second side 5 at the other end. The first and second sides are rigidly connected whereby a generally triangular interior space is formed.

At the juncture of the door 4 and the third side 6 of the enclosure, there is provided a traverse pin having two outwardly-projecting ends 7a and 7b for pivotally supporting the enclosure on both sides of the door 4 in the shell structure as explained below.

The width of the enclosure is slightly less than the interior width of the shell. The height and depth of the enclosure are likewise slight less than the corresponderingg dimensions of the shell structure 1. The enclosure is placed inside the shell, the ends of the pin, 7a and 7b, fitting into two slots or two holes (not shown), one in each side wall 3a or 3b of the shell 1 near the lower end of its front edge. The third side 6 of the enclosure is in the interior of the shell. The second, roof side 5 of the enclosure is generally nearest the top 2 of the shell. The first, door side 4 of the triangular enclosure faces outward from the shell opening between the two side walls 3a and 3b.

The enclosure, when thus placed into the shell, can be tilted back and forth between two positions: a stable position, with the enclosure inside the shell and the interior space of the enclosure totally enclosed by the sides of the enclosure and the side walls of the shell; and a less stable position in which the enclosure is tilted forward such that the door 4 and a portion of the roof 5 of the enclosure are outside the shell and the interior space of the enclosure is exposed to the outside via two openings defined by the edges of the door 4 and roof 5 of the enclosure and the side walls 3a, 3b of the shell. The interior space of the enclosure thus is accessible to a rodent from either side of the door.

Bait is provided on the inner face of the third side 6 of the enclosure adjacent to the juncture of the roof 5 and the third side 6. A ledge 8, traversely affixed to the inner face of side 6 of the enclosure, for the rodent to step on while reaching for the bait. When a rodent climbs into the enclosure through one of its exposed side openings in order to eat the bait and steps on the ledge as it reaches up toward the bait, the animal's weight causes the enclosure to tilt into its stable,closed position, trapping the animal. The placement of ledge 8 on the inner face of side 6 of the triangular enclosure ensures that when the animal approaches the bait, its weight will be in a place where it must upset the equilibrium of the enclosure and make it tilt into its more stable, closed position, with the animal now entrapped.

At the midpoint and outside of the juncture of the roof 5 and third side 6 of the triangular enclosure, there may be provided a projection 10 which, in the enclosure's open position, comes to rest against the underside of the top 2 of the shell. This projection serves to minimize the mechanical effort needed to tilt the trap by reducing friction and preventing the enclosure fro m becoming jammed in the shell structure.

The curvature of the sides of the triangular enclosure serves to minimize the space behind the door within the interior space of the enclosure in which the rodent's weight would fail to tilt the enclosure into the closed position. The rounding of the edges joining the shell structure's top and side walls prevents the rodent from climbing on top of the trap, accidentally unbalancing the enclosure and closing the trap without the rodent having been trapped.

At the juncture of sides 4 and 5 of the triangular enclosure, there is fixed a narrow strip of tab 9 which facilitates the tilting back and forth of the enclosure, such as when the trap is being set or when a trapped rodent is being removed from the enclosure, after the trap has been immersed in water and which further prevents the enclosure from tilting too far backward into the shell structure by coming to rest against the edge of the top of the shell structure when the trap is in its shut position.

Numerous modification and variation of the present invention are possible in light in the above teaching, and therefore, within the scope of the appended claims; the invention may be practiced otherwise than as particularly described.

I claim:

1. A rodent trap comprising: a shell having two parallel side walls and a top; an enclosure of generally triangular shape having a door connected to a roof; a connecting side rigidly connected to said door at one end and to said roof at the other end, said enclosure being pivotally connected to said side walls at a juncture between said door and said connecting side, whereby said enclosure is partially open when it is tilted forward, and said enclosure is totally enclosed by the side walls when it is tilted back by the weight of a rodent having entered the enclosure.

2. A rodent trap of claim 1 wherein the door has a concave outer surface.

3. A rodent trap of claim 2 wherein the roof has a concave outer surface.

4. A rodent trap of claim 3 wherein the connecting side has a convex outer surface.

5. A rodent trap of claim 4 further comprising a ledge traversely mounted on the inner face of said connecting side within the enclosure.

6. A rodent trap of claim 1, wherein the enclosure is connected to the side walls by a traverse pin having two ends extended at either end of the juncture for engaging two slots near the bottom of the side walls.

7. A rodent trap of claim 1 wherein the enclosure is pivotally connected to the side walls by a traverse pin having two extended ends, at the juncture, for engaging two holes near the bottom of the side walls.

8. A rodent trap of 6 further comprising a projection rigidly fixed at the outside of a juncture formed by the roof and connecting side for reducing friction between the roof and the top.

9. A rodent trap of claim 8 further comprising a tab fixed at an upper edge of the door.

10. A rodent trap comprising:
shell having two parallel side walls and a top; an enclosure of generally triangular shape having a concave door, a concave roof, said roof being rigidly connected to said door, and a connecting side rigidly connected to said door at one end and to said roof at the other end, said connecting side being convex; said enclosure being pivotally connected to said side walls by a traverse pin having two extended ends, engaged two slots near the bottom of the walls whereby said enclosure is partially open when it is tilted forward, and said enclosure is totally enclosed by the side walls when it is tilted back by the weight of the rodent having entered the enclosure.

* * * * *